(12) United States Patent
Gürtler et al.

(10) Patent No.: US 7,071,353 B2
(45) Date of Patent: Jul. 4, 2006

(54) POLYISOCYANATES CONTAINING ACYLUREA GROUPS, A PROCESS FOR THEIR PRODUCTION AND THEIR USE

(75) Inventors: Christoph Gürtler, Köln (DE); Martin Brahm, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/085,514

(22) Filed: Feb. 28, 2002

(65) Prior Publication Data

US 2002/0123596 A1   Sep. 5, 2002

(30) Foreign Application Priority Data

Mar. 5, 2001 (DE) ................. 101 10 437

(51) Int. Cl.
*C07C 249/00* (2006.01)
(52) U.S. Cl. ..................... 560/339; 560/336
(58) Field of Classification Search ............... 560/330, 560/337
See application file for complete search history.

(56) References Cited

U.S. PATENT DOCUMENTS

| | | | |
|---|---|---|---|
| 3,383,400 A | 5/1968 | Meisert et al. | 260/453 |
| 3,517,039 A | 6/1970 | Wagner et al. | 260/404.5 |
| 3,970,600 A | 7/1976 | Falkenstein et al. | 260/77.5 NC |
| 4,028,310 A | 6/1977 | Schäfer et al. | 260/77.5 CH |
| 4,616,061 A * | 10/1986 | Henning et al. | 524/591 |
| 5,527,876 A | 6/1996 | Kluth et al. | 528/198 |
| 5,580,947 A * | 12/1996 | Brahm et al. | 528/75 |

OTHER PUBLICATIONS

Patent Abstracts Of Japan vol. 018, No. 511 (C-1253), Sep. 27, 1994 & JP 06 172518 A (Mitsui Toatsu Chem Inc.), Jun. 21, 1994 Zusammenfassung.

Tetrahedron Letters, vol. 27, No. 11, (month unavailable) 1986, pp. 1251-1254, Ian S. Blagvrough, Neil E. Mackenzaie, Claudio Ortiz and A. Ian Scott, "The Condensation Reaction Between Isocyanates and Carboxylic Acids".

Liebigs Ann. Chem. (month unavailable) 1976, pp. 487-495, Pierre Babusiaux, Rémi Longeray, and Jacques Dreux, Zersetzung von *N*-monosubstituierten Carbaminsäure-carbonsäure-anhydriden.

J.Am Oil Chem. Soc., Feb. 1982, pp. 92-94, T. J. Michich, "A Rapid Synthesis of Fatty Acyl Urea Derivatives".

Recl. Trav. Chim. Pays-Bas, 111 (month unavailable) 1992, pp. 88-91, A.H.M. Schoitman and W.J. Mijs, "Carbodiimides as important intermediates in the reaction of Isocyanates with carboxylic acids".

* cited by examiner

*Primary Examiner*—Johann Richter
*Assistant Examiner*—Karl Puttlitz
(74) *Attorney, Agent, or Firm*—Joseph C. Gil; Thomas W. Roy

(57) ABSTRACT

The present invention relates to a process for preparing polyisocyanates containing acylurea groups by reacting isocyanates corresponding to formula (I)

$$R\text{---}(NCO)_n, \quad\quad (I)$$

wherein
R represents an n-valent linear or branched aliphatic group or cycloaliphatic group having 4 to 30 carbon atoms or an aromatic group having 6 to 24 carbon atoms and
n is 1, 2, 3 or 4, with aliphatic and/or aromatic carboxylic acids in the presence of a metal salt catalyst at a temperature of 20 to 220° C.

The present invention also relates to the reaction products (polyisocyanates) prepared by this process and to their use as binders for polyurethane coating compositions.

10 Claims, No Drawings

POLYISOCYANATES CONTAINING ACYLUREA GROUPS, A PROCESS FOR THEIR PRODUCTION AND THEIR USE

BACKGROUND OF THE INVENTION

1. Field of the Invention

This invention relates to polyisocyanates containing acylurea groups, a process for their preparation and their use as starting components in the production of polyurethane plastics, in particular, as cross-linking agents for a binder for coating compositions that contain isocyanate-reactive groups.

2. Description of the Prior Art

The reaction of isocyanates with carboxylic acids is a reaction which previously has not been extensively investigated. The formation of isocyanate polyaddition products containing acylurea groups is described, for example, in P. Babusiaux, R. Longeray, J. Dreux, Liebigs Ann. Chem., 1976, (3), 487, A. H. M. Schotmann, W. J. Mijs, Recl. Trav. Chim. Pays Bas 1992, 111, 88, DE-A 2 436 740 and the literature cited in this work). The condensation reaction of isocyanates with carboxylic acids was also investigated by I. S. Blagbrough, N. E. Mackenzie, C. Ortiz, A. and I. Scott (Tetrahedron Lett. 1986, 27(11), 1251).

The preparation of acylureas by the reaction of amides with isocyanates has also been described, for example, J. T. Micich (J. Am. Oil Chem. Soc. 1982, 59(2), 92–4), which describes the synthesis of acylureas obtained by the reaction of carboxylic acid amides with isocyanates.

German Auslegeschrift DE-A 1 230 778 describes a process for preparing acylated urea polyisocyanates. The procedure starts with monocarboxylic acids, which are added in high dilution to a very large excess of the diisocyanate component. The disadvantages of this process are the high reaction temperatures (approximately 130–140° C.) and the long period of time, lasting approximately 5 hours, over which the monocarboxylic acid is added to the isocyanate. The processes cited are unsuitable for the preparation of polyisocyanates that are to be suitable for applications in the field of coatings because the products yellow due to the high reaction temperatures.

A process for producing plastics containing amide groups is described in EP-A 0 624 170. Aliphatic and aromatic polyisocyanates are reacted with polyfunctional carboxylic acids (at least dicarboxylic acids) and polyalcohols to form plastics. Tertiary amines, such as aminosubstituted pyridines and/or N-substituted imidazoles, are used as catalysts. Nothing is stated regarding the selectivities of this reaction or the secondary reactions. The products obtained are yellow foamed plastics. It is to be assumed from this that in this process the catalyst has an influence on the (yellow) color of the resulting product. Basic tertiary amines, amidines and imidazoles in particular are readily oxidizable and in the course of relatively long reaction times may lead to a yellowing of the reaction batch.

The previous investigations have shown that only the reaction of carboxylic acids with isocyanates, with the aim of producing foamed plastics, leads to colorless products. Apart from that, no conditions which deliver colorless or slightly colored light-fast polyisocyanates by carrying out the reaction at low temperatures and within technically achievable reaction times have been found.

Consequently, from none of the above-mentioned publications was a person skilled in the art able to infer any definite information as to how a catalyst for the formation of reaction products of isocyanates with carboxylic groups, accompanied by liberation of $CO_2$, should be constituted in order to obtain colorless products.

An object of the present invention is to find a process which leads to colorless, unfoamed products, such as polyisocyanates, by modifying the reaction of isocyanates with carboxylic acids.

Surprisingly, it has now been found that by using a suitable catalyst and suitable reaction conditions, the reaction temperatures and/or the reaction time for the reaction of carboxylic acids with isocyanates can be significantly lowered. The process according to the invention is based on the reaction of carboxylic acids with isocyanates with the release of $CO_2$, a catalyst being present in order to achieve a rapid reaction leading to colorless products. In this process, the reaction of the carboxylic acids with isocyanates produces first of all amides, which then form so-called acylureas by reaction with a further isocyanate group.

SUMMARY OF THE INVENTION

The present invention relates to a process for preparing polyisocyanates containing acylurea groups by reacting isocyanates corresponding to formula (I)

$$R-(NCO)_n \qquad (I),$$

wherein

R represents an n-valent linear or branched aliphatic group or cycloaliphatic group having 4 to 30 carbon atoms or an aromatic group having 6 to 24 carbon atoms and n is 1, 2, 3 or 4, with aliphatic and/or aromatic carboxylic acids in the presence of a metal salt catalyst at a temperature of 20 to 220° C.

The present invention also relates to the reaction products (polyisocyanates) prepared by this process and to their use as binders for polyurethane coating compositions.

DETAILED DESCRIPTION OF THE INVENTION

Due to the decreased formation of secondary reactions in the process according to the invention, light-fast products having a color value of <120 [APHA] are obtained. The reaction is shifted in the direction of polyisocyanates. Consequently, it is possible to retard the formation of secondary products in favor of the desired products. Secondary products include a carboxylic anhydride formed from the carboxylic acid or, correspondingly, a urea formed in parallel as a result of the reaction of isocyanate groups with water produced during anhydride formation. However, the polyisocyanate obtained by the process according to the invention may contain a small percentage of carboxylic (poly) anhydride, which forms during the reaction. Equally, the heat stress on the isocyanate may result in the formation of isocyanurates, uretdiones and biurets, to a minor degree.

The process according to the invention provides for the preparation of highly functional polyisocyanates from simple structural units such as monomeric isocyanates and monomeric carboxylic acids.

In the process according to the invention, an isocyanate corresponding to formula (I) is reacted with an aliphatic carboxylic acid. The isocyanate component is usually present in excess. A solvent may also be introduced in order to improve the solubility of the carboxylic acid.

In the process according to the invention a catalyst is added, which accelerates the reaction of the isocyanate with the carboxylic acid, with evolution of carbon dioxide. The reagents are conventionally allowed to react with one another until the carboxylic acid is used up and the resulting amide has completely reacted with additional isocyanate to form, inter alia, the required acylurea. At the end of the reaction, the reaction mixture is freed from monomeric isocyanate by thin-film distillation. The resulting polyisocyanates or mixtures of polyisocyanates, which in addition to the polyisocyanate may also contain anhydrides, biurets, isocyanurates and ureas, have favorable properties as curing agents for light-fast polyisocyanates, depending on the selected reaction conditions and starting materials.

Aromatic and aliphatic mono- and dicarboxylic acids are suitable for the process according to the invention. Polyfunctional carboxylic acids may also be used for the process. Mono- and dicarboxylic acids, which may be open-chain or cyclic, are suitable. Examples of suitable aliphatic acids include acetic acid and other open-chain aliphatic carboxylic acids, which may also have substituents on the carbon chain or other functionalities, such as ether groups. Suitable cyclic acids include cycloaliphatic acids such as cyclohexanecarboxylic acid and perhydronaphthalenecarboxylic acid, and aromatic monocarboxylic acids, such as benzoic acid. Unsaturated carboxylic acids, such as acrylic acid, methacrylic acid and cinnamic acid, may also be used in the process.

Also suitable for the process according to the invention are open-chain difunctional aliphatic carboxylic acids such as succinic acid, adipic acid, azelaic acid, dodecanedioic acid, eicosanedioic acid and aliphatic dicarboxylic acids having an odd number of carbon atoms; cyclic dicarboxylic acids such as cyclohexanedicarboxylic acid; and aromatic dicarboxylic acids such as phthalic acid. Aliphatic carboxylic acids which have an additional amino functionality are also suitable. Aliphatic dicarboxylic acids having a chain length of $C_3$ to $C_{20}$ are preferably used. Adipic acid, azelaic acid and dodecanedioic acid (for example, α,ω-dodecanedicarboxylic acid) are particularly preferred.

The mono-, di- or polyfunctional carboxylic acids may be used individually or as mixtures in the process according to the invention. In a preferred embodiment, a binary or ternary mixture of dicarboxylic acids having a chain length of $C_3$ to $C_{20}$ is used in a ratio of 0.1:1 to 1:0.1 for binary mixtures and 0.1:0.1:1 to 0.1:0.1 for ternary mixtures. Preferably, azelaic acid and adipic acid in a ratio of 1:3 are used.

In the process according to the invention, the carboxylic acid or the mixture of carboxylic acids is added to the isocyanate. Suitable isocyanates include any (cyclo)aliphatic or aromatic isocyanate or mixtures thereof. Mono-, di- or trifunctional isocyanates, which may have carbon chains of differing length between the isocyanate groups, are suitable. Examples include butane diisocyanate (BDI), pentane diisocyanate, hexane diisocyanate (HDI), 3-isocyanatomethyl-1,8-diisocyanatooctane (triisocyanatononane, TIN), 4,4'-methylenebis(cyclohexylisocyanate) (Desmodur W, $H_{12}$MDI), 3,5,5-trimethyl-1-isocyanato-3-isocyanatomethyl-cyclohexane (IPDI) and ω,ω'-diisocyanato-1,3-dimethylcyclohexane ($H_6$XDI). Examples of aromatic isocyanates include toluene diisocyanate (TDI), diphenylmethane disocyanate (MDI) and 1,5-diisocyanatonaphthalene.

Preferred diisocyanates include open-chain aliphatic diisocyanates having a carbon chain length of $C_4$ to $C_6$ (butane isocyanate or hexamethylene diisocyanate, HDI), a diisocyanate having an isophorone structure (IPDI, isophorone diisocyanate) or an aliphatic diisocyanate having a cyclohexane structural unit (methylenedicyclohexyl diisocyanate, $H_{12}$MDI). Triisocyanatononane (TIN) is preferably used as a trifunctional isocyanate.

The carboxylic acid or the mixture of carboxylic acids may be introduced in solid form or after they have been dissolved in a suitable solvent. All solvents which dissolve carboxylic acids or carboxylic acid mixtures are suitable for dissolving the carboxylic acid or the mixture of carboxylic acids. Suitable solvents include tetrahydrofuran and ethylene glycol dimethyl ether, esters, and triethyl phosphate. The quantity of solvent used is adjusted according to the solubility of the carboxylic acid or the carboxylic acid mixture in this solvent. In a preferred embodiment of the process according to the invention, the carboxylic acid or the carboxylic acid mixture is dissolved in the solvent to form a 10 to 80 wt. % solution, preferably a 20 to 40 wt. % solution.

The reaction may be carried out with or without an additional reaction medium. Suitable reaction media include high-boiling aromatic solvents, such as chlorobenzene or dichlorobenzene, or high-boiling ethers. In a preferred embodiment of the process according to the invention, the reaction is carried out in the presence of a chemically neutral solvent, such as triethyl phosphate or other phosphate esters. The cosolvent may be used in any quantity, which may be from 1 wt. % up to several hundred wt. % of the carboxylic acids used and is selected according to the required reaction rate or with regard to the required composition of the polyisocyanate to be formed.

The quantity of the secondary products formed in the process according to the invention depends, inter alia, on the quantity and nature of the solvent used for dissolving the carboxylic acid or the carboxylic acid mixture.

The carboxylic acid or the carboxylic acid mixture may be added to the reaction solution at room temperature or at elevated temperatures of up to 150° C. The temperature range is preferably 0° C. to 100° C., more preferably 20° C. to 70° C.

After the reaction has been carried out, the solvent can be removed from the reaction batch by heating or by applying additional vacuum, depending upon the solvent employed.

The reaction of carboxylic acids with isocyanates is accelerated by the use of a catalyst. Suitable catalysts include (metal) salts of elements of the first, second and third main group and the second and third subgroup of the periodic system of Mendeleev, as well as salts of the lanthanides. Examples include butylpyridinium tetrafluoroborate, aluminium acetylacetonate, sodium chloride, aluminium triethoxide, butylpyridinium hexafluorophosphate, methylbutylimidazolium tetrafluoroborate, DBTL (dibutyltin dilaurate), methylbutylimidazolium butylsulfonate, aluminium triethoxide, bismuth(III) 2-ethylhexanoate, lithium hexafluorophosphate, caesium methylsulfonate, potassium triflate, methylbutylimidazolium hexafluorophosphate, bismuth(III) acetate, sodium methylsulfonate, zinc 2-ethylhexanoate, bismuth(III) neodecanoate, pyridinium triflate, lithium tetrafluoroborate, sodium triflate, bismuth(III) acetate, lithium chloride, lithium perchlorate, zinc triflate, lithium triflate, calcium phosphate, calcium chloride, scandium(III) trifluoromethanesulfonate, calcium chloride, scandium(III) acetate hydrate, magnesium acetylacetonate, calcium bis(2,2,6,6-tetra-methyl-3,5-heptanedionate), calcium perchlorate, calcium stearate, lanthanum(III) acetate hydrate, magnesium n-propoxide, magnesium chloride, magnesium 2,4-pentanedionate, magnesium trifluoro-methylsulfonate, magnesium perchlorate, ytterbium(III) trifluoromethylsulfonate and magnesium stearate.

The amine bases, which are known catalysts for accelerating the reaction of carboxylic acids with isocyanates, exhibit the disadvantage that a slight yellowing of the product may occur during relatively long reaction times and at more elevated temperatures. Previously mentioned reaction accelerators include triethylamine, DBU (diazabicycloundecene) and DBN (diazabicyclononene).

Preferred catalysts for the reaction of cyclic isocyanates with aliphatic carboxylic acids are aluminium triethoxide, DBTL (dibutyltin dilaurate), bismuth(III) acetate, sodium triflate, potassium triflate, triethylamine, lithium triflate, zinc 2-ethylhexanoate, calcium perchlorate, calcium stearate, magnesium stearate and magnesium perchlorate. Salts of elements of the second main group of the periodic system are particularly preferred for use as catalysts.

Preferred catalysts for the reaction of cycloaliphatic carboxylic acids with aliphatic isocyanates include butylpyridinium tetrafluoroborate, bismuth(III) acetate, triethylamine, DBTL (dibutyltin dilaurate), DBU (diazabicycloundecene), zinc 2-ethylhexanoate, zinc(II) laurate, aluminium triethoxide, sodium triflate, potassium triflate, lithium triflate, calcium chloride, ytterbium trifluoromethylsulfonate, calcium perchlorate, calcium stearate, magnesium stearate and magnesium perchlorate. Salts of the elements of the second and third main group as well as the lanthanides are particularly preferred.

In the carrying out of the process according to the invention, after addition of the carboxylic acid or the carboxylic acid mixture to the isocyanate or vice versa, and in the presence of the catalyst, the reaction mixture is stirred until the evolution of gas has ceased. It is then heated to a higher temperature. The choice of the reaction temperature is generally not crucial, but a yellowing of the polyisocyanate is observed at excessively high temperatures. Suitable temperatures are 20° C. to 220° C., preferably 80° C. to 150° C. and more preferably 100° C. to 140° C. Unlike the known reactions, which are not carried out in the presence of a catalyst, in the catalyzed reaction there is a distinctly lower discoloration of the reaction mixture even at more elevated temperatures.

The duration of the reaction is in general determined by the required degree of functionality of the reaction products, i.e. predominantly the formation of polyisocyanates based on acylureas. Typically, longer reaction times result in a higher functionality. The determination of the NCO content of the reaction mixture gives an indication of the functionality of the mixture; however, other factors, such as the formation of carboxylic anhydrides, may simulate an inaccurate (i.e. excessively high) NCO content. When the required NCO content has been attained, the reaction mixture is cooled to room temperature.

At the end of the reaction, the reaction mixture is freed from monomeric isocyanate using a thin-film evaporator. Thin-film evaporation is carried out under a suitable vacuum, preferably within a temperature range of 100° C. to 180° C., more preferably 120° C. to 160° C.

The polyisocyanates prepared from aliphatic isocyanates by the process according to the invention can in particular be used as curing agents for the production of polyurethane (PU) coatings for light-fast applications, so-called DD coating systems.

EXAMPLES

Example 1

1411.2 g of hexamethylene diisocyanate, 54 mg of magnesium trifluorosulfonate and 150 mg each of lonol and Tinuvin 770 were placed in a 2 l three-necked flask. 51.15 g of adipic acid and 21.96 g of azelaic acid, both dissolved in 282 g of triethyl phosphate, were added to this mixture over a period of 30 minutes. During the addition, the temperature was 60° C. On conclusion of the addition, the mixture was heated to 110° C. Heating was continued over a period of 15 hours. The mixture was then allowed to cool. The NCO content of the solution was 36.1% (theoretical NCO content for the conversion to tetrafunctional acylurea: 36.3%). The reaction solution was subjected to thin-film distillation (temperature 130° C., pressure $1.5\times10^{-2}$ bar). 334 g of a product having a color value of 60 [APHA] and a viscosity of 3870 mPas (yield 23%, based on acid and isocyanate) was obtained. The amount of monomeric hexamethylene diisocyanate was approx. 0.1%.

Example 2

604.8 g of hexamethylene diisocyanate, 11 mg of zinc acetate and 60 mg each of lonol and Tinuvin 770 were placed in a 1 liter, three-necked flask. 21.92 g of adipic acid and 9.41 g of azelaic acid were added to this mixture. On conclusion of the addition, the temperature was adjusted to 120° C. Heating was continued over a period of 12 hours. The mixture was then allowed to cool. The NCO content of the solution was 43.4% (theoretical NCO content for the conversion to tetrafunctional acylurea: 43.5%). The reaction solution was subjected to thin-film distillation (temperature 130° C., pressure $1.5\times10^{-2}$ bar). 143.4 g of a product having a color value of 65 [APHA] and a viscosity of 2250 mPas (yield 23.2%, based on acid and isocyanate) was obtained. The amount of monomeric hexamethylene diisocyanate was approx. 0.1%.

Example 3

75.68 g of cyclohexanedicarboxylic acid, 20.7 g of azelaic acid, 50 mg of zinc acetate and 260 mg each of lonol and Tinuvin 770 were placed in a 2.5 liter, three-necked flask. 1663.2 g of hexamethylene diisocyanate were added to this mixture. On conclusion of the addition, the temperature was adjusted to 120° C. Heating was continued over a period of 12 hours. The mixture was then allowed to cool. The NCO content of the solution was 42.2% (theoretical NCO content for the conversion to tetrafunctional acylurea: 42.01%). The reaction solution was subjected to thin-film distillation (temperature 130° C., pressure $1.5\times10^{-2}$ bar). 400 g of a product having a color value of 65 [APHA] and a viscosity of 7150 mPas (yield 22.7%, based on acid and isocyanate) was obtained. The product had an NCO content of 24.7%. The amount of monomeric hexamethylene diisocyanate was approx. 0.1%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a polyisocyanate containing acylurea groups which comprises reacting an isocyanate corresponding to formula (I)

R—(NCO)$_n$ (I), wherein

R represents an n-valent linear or branched aliphatic group or cycloaliphatic group having 4 to 30 carbon atoms or an aromatic group having 6 to 24 carbon atoms and n is 1, 2, 3 or 4, with an aliphatic and/or aromatic carboxylic acid in the presence of a metal-salt catalyst selected from the group consisting of salts of group IIA elements, salts of group IIB elements and salts of lanthanides, at a temperature of 20 to 220° C.

2. The process of claim 1 wherein the isocyanate comprises hexane diisocyanate, 3,5,5-trimethyl-1-isocyanato-3-isocyanatomethyl-cyclohexane, 3-isocyanatomethyl-1,8-diisocyanatooctane, and/or 4,4'-methylenebis (cyclohexylisocyanate).

3. The process of claim 1 wherein the isocyanate comprises toluene diisocyanate, diphenylmethane diisocyanate or 1,5-diisocyanatonaphthalene.

4. The process of claim 1 wherein the carboxylic acid comprises acetic acid, hexanoic acid, adipic acid, azelaic acid, cyclohexanedicarboxyl acid, cyclohexane carboxylic acid, perhydronaphthalene carboxylic acid, succinic acid, eicosaneodioic acid, aromatic mono- or dicarboxylic acids, dodecanedioic acid and mixtures thereof.

5. The process of claim 2 wherein the carboxylic acid comprises acetic acid, hexanoic acid, adipic acid, azelaic acid, cyclohexanedicarboxylic acid, cyclohexane carboxylic acid, perhydronaphthalene carboxylic acid, succinic acid, eicosaneodioic acid, aromatic mono- or dicarboxylic acids, dodecanedioic acid and mixtures thereof.

6. The process of claim 3 wherein the carboxylic acid comprises acetic acid, hexanoic acid, adipic acid, azelaic acid, cyclohexanedicarboxylic acid, cyclohexane carboxylic acid, perhydronaphthalene carboxylic acid, succinic acid, eicosaneodioic acid, aromatic mono- or dicarboxylic acids dodecanedioic acid and mixtures thereof.

7. The process of claim 1 wherein an aromatic carboxylic acid is used and comprises phthalic acid.

8. The process of claim 2 wherein an aromatic carboxylic acid is used and comprises phthalic acid.

9. The process of claim 3 wherein an aromatic carboxylic acid is used and comprises phthalic acid.

10. The process of claim 1, wherein the color value of the polyisocyanate is <120 [APHA].

* * * * *